Feb. 9, 1926.                                                              1,572,297
                              A. LAVER
                        LAWN MOWER ATTACHMENT
                   Filed April 9, 1923        2 Sheets-Sheet 1
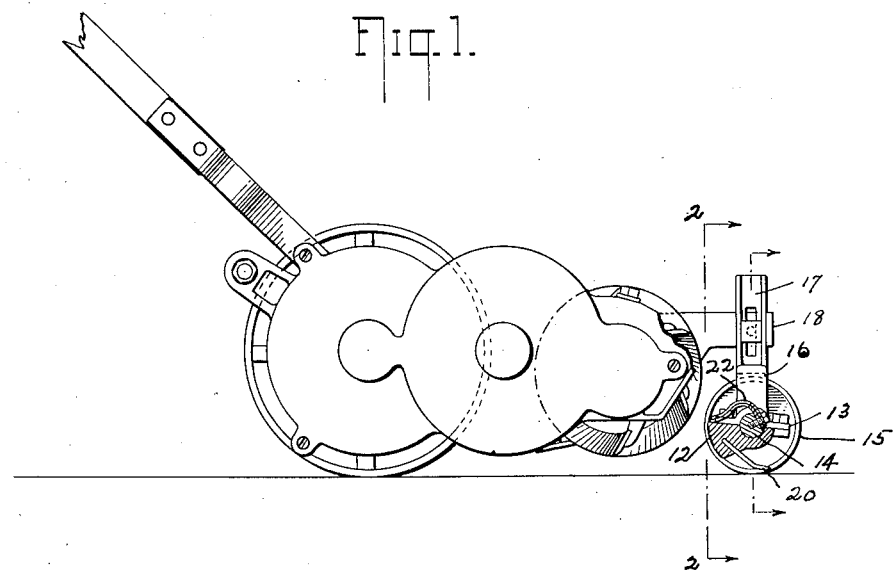
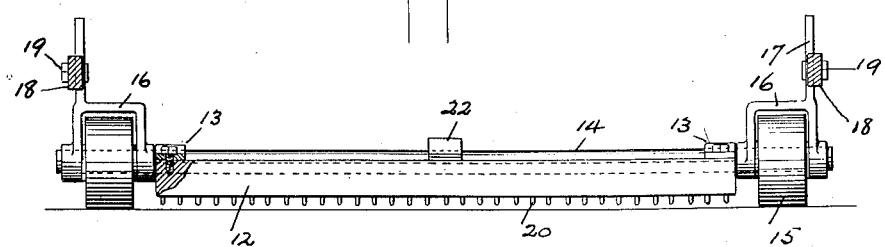
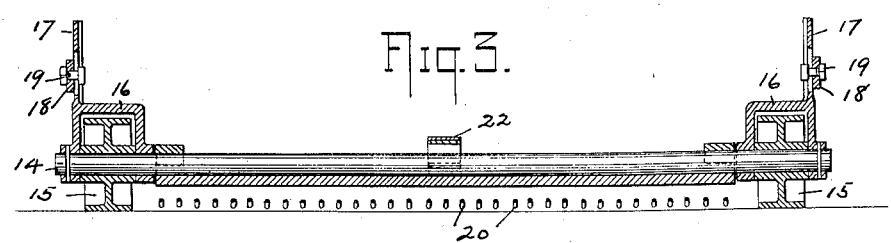
Inventor
ARTHUR LAVER
By his Attorney Feb. 9, 1926.
A. LAVER
LAWN MOWER ATTACHMENT
Filed April 9, 1923    2 Sheets-Sheet 2
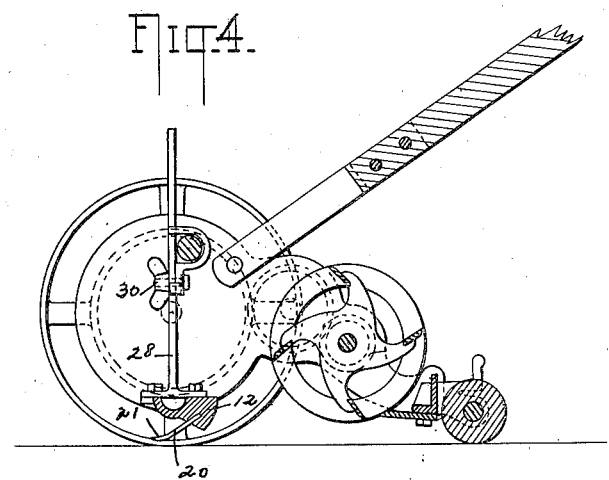
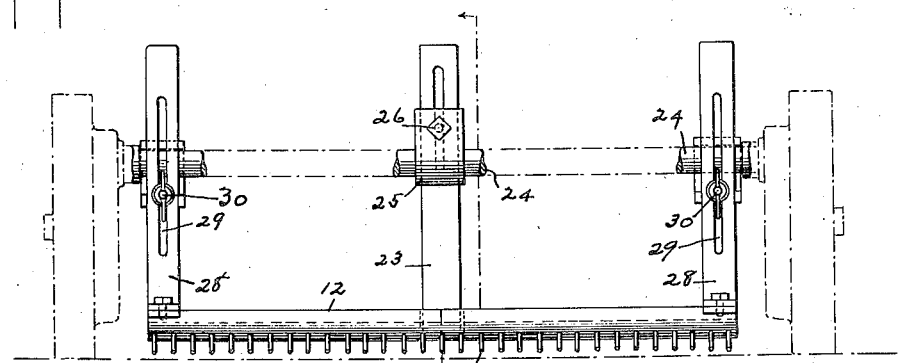
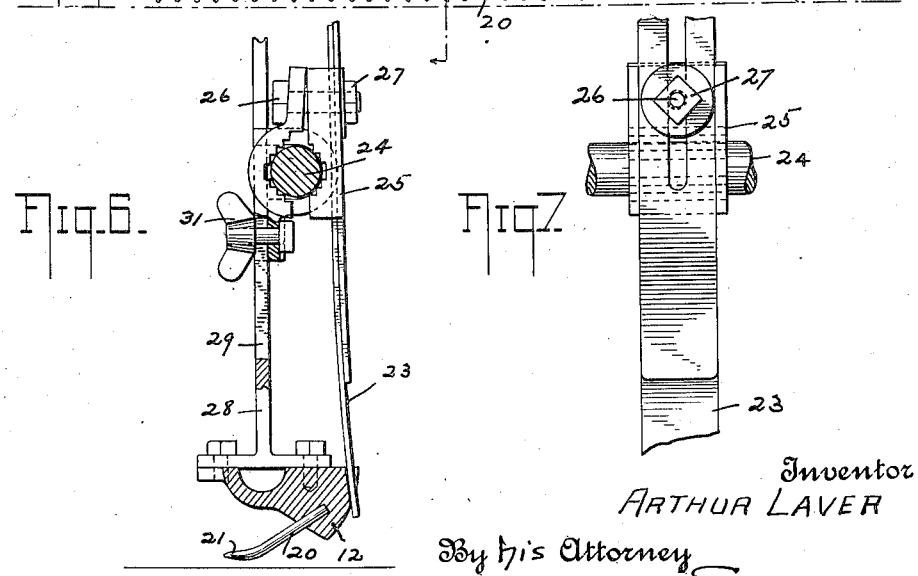
Inventor
ARTHUR LAVER
By his Attorney Patented Feb. 9, 1926.

1,572,297

UNITED STATES PATENT OFFICE.

ARTHUR LAVER, OF BAYSIDE, NEW YORK.

LAWN-MOWER ATTACHMENT.

Application filed April 9, 1923. Serial No. 630,718.

*To all whom it may concern:*

Be it known that I, ARTHUR LAVER, a citizen of the United States, and a resident of Bayside, county of Queens, State of New York, have invented new and useful Improvements in Lawn-Mower Attachments, of which the following is a specification.

Among the principal objects which the present invention has in view are: to provide means whereby low lying grass and other running growth is raised in front of the cutting knives of a lawn mower to be shorn thereby; to provide means for operating in the manner indicated by avoiding breakage of the parts utilized therefor; and to simplify and cheapen the construction of the apparatus for procuring the above mentioned results.

*Drawings.*

Figure 1 is a side view of a putting green roller mower of approved type having attached thereto means for raising low lying grass and similar growths, said means being constructed and arranged in accordance with the present invention;

Figure 2 is a detail view showing in section the rear of the comb with which the mower is provided, the view being taken as on the line 2—2 in Figure 1;

Figure 3 is a section of the same, the section being taken as on the line 3—3 in Figure 1;

Figure 4 is a section of the modified form of the mower, the section being taken as on the line 4—4 in Figure 5;

Figure 5 is a front view of the comb frame and hanger therefor when employed in conjunction with the mower shown in Figure 4;

Figure 6 is a detail view on enlarged scale in cross section showing the comb and hanger therefor with yielding means for holding the comb in working position; and Figure 7 is a rear view of the spring for holding the comb in position.

*Description.*

When employed in conjunction with the preferred form of mower such as shown in Figures 1 to 3 inclusive the comb back 12 is pivotally supported by clamp bearings 13 on the spreader bar 14 forming the axles of the adjusting rollers 15 with which the mower is provided. The rollers 15 are held in bracket yokes 16, the bar extensions 17 whereof are slidably held in the reach bars 18 of the side bars of the mower. Adjusting nuts 19 determine the height at which the reach bars 18 are to be held from the ground.

The back 12 is preferably constructed, as best seen in Figures 1 and 6, of solid metal in which are bedded tines 20 forming the teeth of the comb. The extremities 21 of the tines 20 are slightly upturned to avoid digging into the ground, being preferably disposed as shown in said Figures 1 and 6 to slide over the ground when level. To hold the comb 12 in normal position springs 22 and 23 respectively are employed. When employing the spring 23 it is clamped rigidly on the spreader bar 24 by means of clamping jaws 25 of usual construction. The jaws 25 are drawn tight by means of bolts 26 and nuts 27 thereon.

When using the hanger for the comb 12 shown in Figures 4 to 7 inclusive, the hanger bars 28 are employed, the slots 29 therein affording means for sliding over the shanks 30 of the bolt on which the thumb nut 31 is mounted. By loosening and tightening the thumb nut 31 the bars 28 may be adjusted to regulate the elevation for the comb 12 to work. By means of this attachment it is obvious that the comb may be raised more at one end than at the other thereby accommodating the tool for employment on various grades of ground.

The operation of the comb 12 when employed in conjunction with the mower as shown in the drawings is to extend the tines 21 under the low-lying sections of the crab grass or similar growth and of certain classes of weed to lift them sufficiently without marring the turf and to yield backward in releasing the same having lifted them in the path of the cutting blades of the mower. Immediately the tines are released from the grass or weed the springs 22 and 23 return them to their working position ready to engage and lift other grass or weeds.

*Claims.*

1. The combination with a lawn mower having a frame and a cutting mechanism of a comb mounted on the mower in advance of the cutting mechanism thereof, said comb comprising a weighted back and forwardly advanced tines extending therefrom, spring tension means between said back and mower frame for resiliently retaining said comb in working position, and means for adjusting the working position of said comb relative to the mower.

2. The combination with a lawn mower having a frame and a cutting mechanism, of a comb pivotally suspended from the mower frame in advance of the cutting mechanism, a weighted back on said comb for maintaining the tines thereof in operative position, and spring connection between said back and the mower frame for permitting rearward yielding of said comb.

ARTHUR LAVER.